US011288372B2

(12) United States Patent
Ladkani et al.

(10) Patent No.: US 11,288,372 B2
(45) Date of Patent: Mar. 29, 2022

(54) SECURE INSTALLATION OF BASEBOARD MANAGEMENT CONTROLLER FIRMWARE VIA A PHYSICAL INTERFACE

(71) Applicant: Microsoft Technology Licensing, LLC, Redmond, WA (US)

(72) Inventors: Neeraj Ladkani, Bothell, WA (US); Bryan David Kelly, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 253 days.

(21) Appl. No.: 16/595,159

(22) Filed: Oct. 7, 2019

(65) Prior Publication Data

US 2021/0103659 A1   Apr. 8, 2021

(51) Int. Cl.
*G06F 8/61* (2018.01)
*G06F 21/57* (2013.01)
*G06F 8/654* (2018.01)

(52) U.S. Cl.
CPC .............. *G06F 21/572* (2013.01); *G06F 8/61* (2013.01); *G06F 21/575* (2013.01); *G06F 2221/033* (2013.01)

(58) Field of Classification Search
CPC ........ G06F 21/572; G06F 8/61; G06F 21/575; G06F 2221/033; G06F 8/654
USPC ................................................ 713/1, 2, 100
See application file for complete search history.

(56) References Cited

U.S. PATENT DOCUMENTS

| 7,721,125 | B2 | 5/2010 | Fung |
| 7,849,454 | B2 | 12/2010 | Lambert et al. |
| 8,194,534 | B2 | 6/2012 | Pandey et al. |
| 8,417,774 | B2 | 4/2013 | Flynn et al. |
| 9,565,207 | B1 | 2/2017 | Marr et al. |

(Continued)

FOREIGN PATENT DOCUMENTS

CN          103984584 A      8/2014

OTHER PUBLICATIONS

"International Search Report and Written Opinion Issued in PCT Application No. PCT/US20/046875", dated Nov. 10, 2020, 14 Pages.

(Continued)

*Primary Examiner* — Michael J Brown
(74) *Attorney, Agent, or Firm* — Ray Quinney & Nebeker; Tiffany Healy

(57) ABSTRACT

A computing device includes circuitry that is configured to disable a physical interface between a baseboard management controller (BMC) and a processor when the BMC is not running and a logical interface between the BMC and the processor is not available. Disabling the physical interface prevents an attacker from writing malicious code to the BMC using the physical interface. The computing device also includes circuitry that enables the physical interface between the BMC and the processor in response to receiving a unique signal sequence from a trusted external entity. When firmware should be installed on the BMC, someone with proper authorization can cause the trusted external entity to send the unique signal sequence to the circuitry on the computing device, thereby enabling the physical interface between the BMC and the processor. The processor can then write the firmware to non-volatile memory within the BMC across the physical interface.

18 Claims, 7 Drawing Sheets

(56) References Cited

U.S. PATENT DOCUMENTS

| | | |
|---|---|---|
| 9,652,216 B2 | 5/2017 | Dharmadhikari et al. |
| 9,773,115 B2 | 9/2017 | Jacobs |
| 2008/0222347 A1* | 9/2008 | Chamberlain .......... G06F 21/79 711/103 |
| 2018/0039546 A1 | 2/2018 | Lambert et al. |
| 2018/0165455 A1 | 6/2018 | Liguori et al. |
| 2018/0276385 A1 | 9/2018 | Heck et al. |
| 2020/0218811 A1* | 7/2020 | Rangel-Martinez .... G06F 21/44 |

OTHER PUBLICATIONS

"Chapter: Blade Server Hardware Management", Retrieved from: https://www.cisco.com/c/en/us/td/docs/unified_computing/ucs/ucs-manager/GUI-User-Guides/Infrastructure-Mgmt/3-1/b_UCSM_GUI_Infrastructure_Management_Guide_3_1/b_UCSM_GUI_Infrastructure_Management_Guide_3_1_chapter_0111.html, Jul. 30, 2019, 15 Pages.

"HPE Integrated Lights-Out 2 (iLO2)—Security", Retrieved from: https://support.hpe.com/hpsc/doc/public/display?docLocale=en_US&docId=emr_na-a00043385en_us#N100A4, Jul. 30, 2019, 4 Pages.

"IBM Support", Retrieved from: https://www.ibm.com/support/pages/need-wait-several-minutes-removal-blade-ibm-bladecenter, Jul. 30, 2019, 3 Pages.

"Lenovo Integrated Management Module I", Retrieved from: ftp://ftp.software.ibm.com/systems/support/system_x_pdf/00wa171_en.pdf, Feb. 2015, 176 Pages.

\* cited by examiner

SECURE INSTALLATION OF BASEBOARD MANAGEMENT CONTROLLER FIRMWARE VIA A PHYSICAL INTERFACE

CROSS-REFERENCE TO RELATED APPLICATIONS

N/A

BACKGROUND

A baseboard management controller (BMC) is a specialized microcontroller that can be embedded on the motherboard of a computing device. Where multiple computing devices are connected and work together, BMCs are typically included in the computing devices because they allow system administrators to perform various tasks remotely. For example, a system administrator can remotely communicate with a BMC to take corrective actions, such as resetting or power cycling a computing device. In addition, different types of sensors built into the computing device report to the BMC on parameters such as temperature, cooling fan speeds, power status, operating system (OS) status, etc. The BMC monitors the sensors and can send alerts to another entity (e.g., another computing device operated by a system administrator) if any of the parameters do not stay within pre-set limits.

For various reasons, BMCs are high-value targets to malicious attackers. For example, attackers can use the out-of-band management features of the BMC to compromise computing devices even below the level of the operating system and system firmware. Therefore, BMCs are currently an area of active research for companies and other organizations that are concerned with security-related issues. Several security vulnerabilities have been discovered with respect to BMCs, including security vulnerabilities related to the installation of firmware within BMCs. If such security vulnerabilities are exploited, then attackers can write malicious code into the BMC firmware. Accordingly, benefits can be realized by improved techniques for protecting BMCs against security attacks.

SUMMARY

In accordance with one aspect of the present disclosure, a computing device is disclosed that includes a processor, memory in electronic communication with the processor, a baseband management controller (BMC) that includes non-volatile memory, and a physical interface between the BMC and the processor. The computing device also includes circuitry that is configured to disable the physical interface when the BMC is not running and to enable the physical interface in response to receiving an authorization signal sequence from a trusted external entity. The computing device also includes instructions stored in the memory, the instructions being executable by the processor to install firmware within the non-volatile memory of the BMC via the physical interface when the BMC is not running and the physical interface is enabled.

The circuitry may include disabling circuitry that is configured to disable the physical interface in response to detecting that the BMC has entered a reset mode and enabling circuitry that is configured to enable the physical interface in response to receiving the authorization signal sequence.

The disabling circuitry may be configured to disable the physical interface in response to detecting that the BMC has entered the reset mode unless the authorization signal sequence is received in coordination with the BMC entering the reset mode.

The enabling circuitry may be configured to enable the physical interface only for a single BMC boot sequence in response to receiving the authorization signal sequence.

The firmware may implement a logical interface between the BMC and the processor. The logical interface may be configured to verify authenticity of the firmware. The logical interface may not be available when the BMC is not running.

The authorization signal sequence may include a unique sequence of binary signals. The circuitry that enables the physical interface may include a programmable logic device that is programmed to recognize the unique sequence.

Disabling the physical interface may include disconnecting the physical interface from a system clock and enabling the physical interface may include connecting the physical interface to the system clock.

The computing device may be one of a plurality of computing devices that are located within a rack. The trusted external entity may include a rack manager.

The authorization signal sequence may be received from the trusted external entity via a secure, out-of-band communication channel.

In accordance with another aspect of the present disclosure, a system is disclosed that includes a trusted external entity and a plurality of host computing devices in electronic communication with the trusted external entity. Each of the plurality of host computing devices includes a host processor, a baseband management controller (BMC), a physical interface between the host processor and the BMC, and circuitry. The circuitry is configured to disable the physical interface between the host processor and the BMC when the BMC is not running and enable the physical interface between the host processor and the BMC in response to receiving an authorization signal sequence from the trusted external entity.

Each of the plurality of host computing devices may further include memory in electronic communication with the host processor and instructions stored in the memory. The instructions may be executable by the host processor to install firmware within the non-volatile memory of the BMC via the physical interface when the BMC is not running and the physical interface is enabled.

The circuitry may include disabling circuitry that is configured to disable the physical interface in response to detecting that the BMC has entered a reset mode and enabling circuitry that is configured to enable the physical interface in response to receiving the authorization signal sequence.

The disabling circuitry may be configured to disable the physical interface in response to detecting that the BMC has entered the reset mode unless the authorization signal sequence is received in coordination with the BMC entering the reset mode.

The enabling circuitry may be configured to enable the physical interface only for a single BMC boot sequence in response to receiving the authorization signal sequence.

Firmware in the BMC may implement a logical interface between the BMC and the host processor. The logical interface may be configured to verify authenticity of the firmware. The logical interface may not be available when the BMC is not running.

The authorization signal sequence includes a unique sequence of binary signals. The circuitry that enables the physical interface may include a programmable logic device that is programmed to recognize the unique sequence.

Disabling the physical interface may include disconnecting the physical interface from a system clock. Enabling the physical interface may include connecting the physical interface to the system clock.

The plurality of host computing devices may be located within a rack. The trusted external entity may include a rack manager.

The system may further include a secure, out-of-band communication channel between the trusted external entity and the circuitry that receives the authorization signal sequence. The trusted external entity sends the authorization signal sequence to the circuitry via the secure, out-of-band communication channel.

In accordance with another aspect of the present disclosure, a computer-readable medium is disclosed. The computer-readable medium includes instructions that are executable by one or more processors to cause a computing system to detect that a baseboard management controller (BMC) within a host computing device has stopped running, make replacement firmware available to a host processor within the host computing device, and send a signal to a trusted external entity that causes the trusted external entity to send an authorization signal sequence to the host computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure can be realized and obtained by means of the systems and methods that are particularly pointed out in the appended claims. Features of the present disclosure will become more fully apparent from the following description and appended claims, or can be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
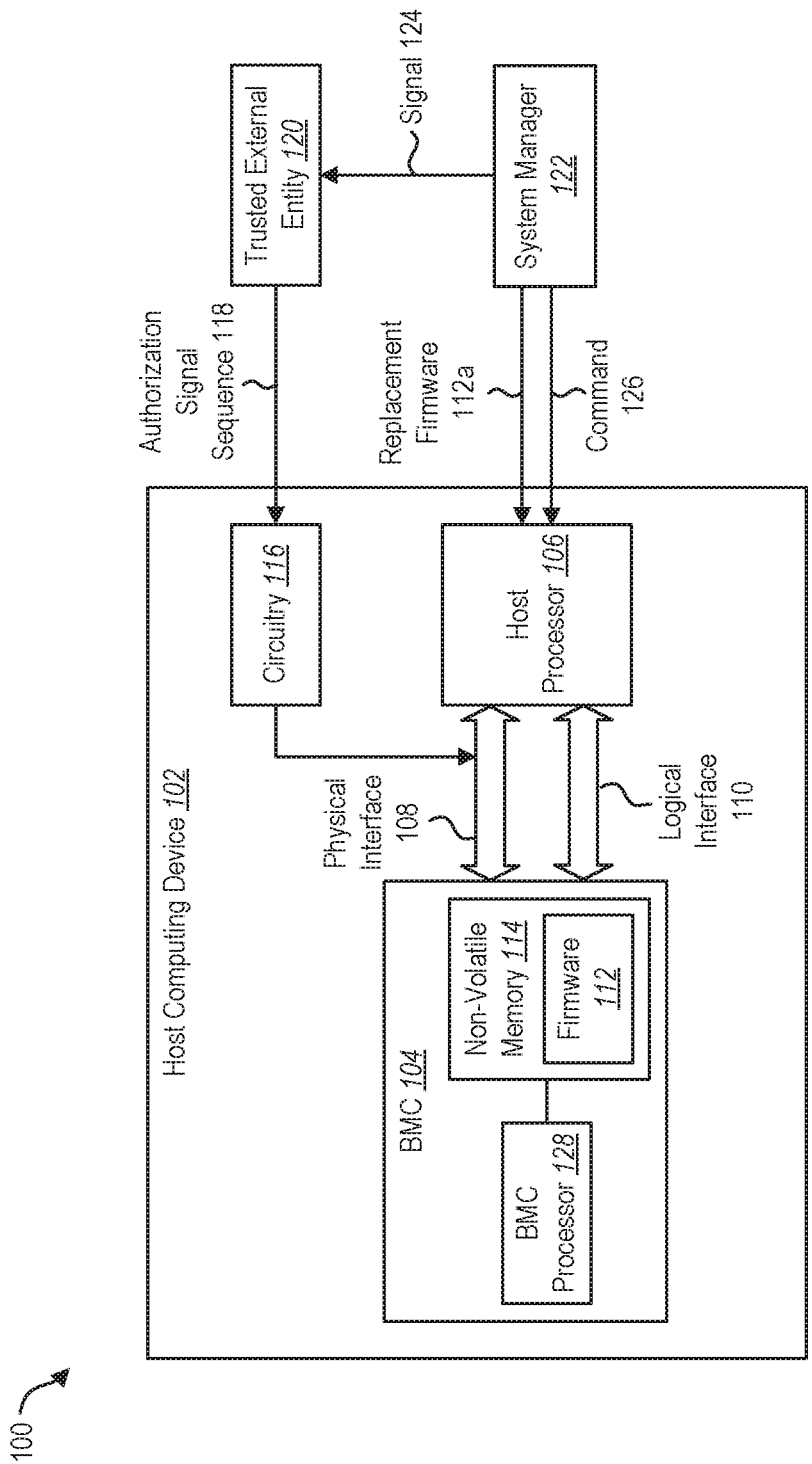
FIG. 1 illustrates an example of a system that enables firmware to be securely installed within a BMC even when the BMC is not running.

The present disclosure is generally related to protecting BMCs from security attacks. One known security vulnerability with BMCs is related to the process of installing firmware within a BMC. Under normal circumstances, a host processor can install firmware within a BMC via a logical interface between the host processor and the BMC. The logical interface can specify certain security mechanisms that make the process of installing firmware within the BMC relatively secure. For example, the logical interface can be configured to verify the authenticity of firmware that is being installed within the BMC.

The logical interface between the BMC and the host processor can be implemented at least in part by the firmware within the BMC. Thus, the BMC's current firmware can implement the security mechanisms that make it possible to securely install replacement firmware within the BMC. Under some circumstances, however, the BMC can stop functioning properly. When this occurs, the logical interface between the host processor and the BMC is no longer available, because the logical interface depends in part on instructions contained within the BMC's firmware. If the logical interface between the BMC and the host processor is not available, the security mechanisms that make it possible to securely install replacement firmware within the BMC are also not available.

When the BMC is not running and the logical interface between the host processor and the BMC is unavailable, it can still be possible for the host processor to install firmware within the BMC using just the physical interface. The host processor can take control of the BMC and write information (e.g., replacement firmware) to non-volatile memory within the BMC across the physical interface. Unfortunately, this mechanism for installing firmware using just the physical interface makes the BMC vulnerable to security attacks. For example, if an attacker is able to gain access to the host processor, then the attacker can write malicious code to the non-volatile memory of the BMC via the physical interface. Because the BMC is not running and the logical interface between the host processor and the BMC is not available, the security mechanisms that are included within the logical interface are not available to stop such an attack.

To address this vulnerability, the physical interface between the BMC and the host processor can be disabled when the BMC is not running. Therefore, even if an attacker is able to gain access to the host processor, the attacker will not be able to write any malicious code to the non-volatile memory of the BMC. However, disabling the physical interface also prevents an authorized user (e.g., a system administrator) from installing firmware within the BMC when the BMC is not running, which can be problematic. If the BMC is not functioning, the BMC may need firmware to be installed in order to start functioning again (either a reinstallation of previously installed firmware, or an installation of updated firmware). However, because the BMC is not functioning properly, the normal mechanism for installing firmware within the BMC via the logical interface is not available. If the physical interface between the BMC and the host processor is disabled to address the potential security vulnerability discussed above, then there is no way to remotely install firmware within the BMC. In other words, the BMC is essentially stuck in a non-functioning state.

The techniques disclosed herein enable someone with proper authorization to install firmware within the BMC when the BMC is not running while still addressing the security vulnerability described above. In other words, the techniques disclosed herein enable firmware to be installed within a BMC in a secure way even when the BMC is not running. The BMC firmware can be installed from a remote location, which can be particularly useful in an environment where BMC firmware should be installed in a plurality of computing devices.

In accordance with the present disclosure, a host computing device can include circuitry that is configured to disable the physical interface between the BMC and the host processor when the BMC is not running and the logical interface between the BMC and the host processor is not available, thereby preventing an attacker from writing malicious code to the BMC using the physical interface. Advantageously, however, the host computing device also includes circuitry that is configured to enable the physical interface between the BMC and the host processor in response to receiving a unique signal sequence from a trusted external entity. Therefore, when the BMC is not running and firmware should be installed on the BMC, someone with proper authorization can make it possible for the firmware to be installed by causing the trusted external entity to send the unique signal sequence to the circuitry on the host computing device, thereby enabling the physical interface between the BMC and the host processor. Once the physical interface has been enabled, the host processor can then write the firmware to non-volatile memory within the BMC across the physical interface.

FIG. 1 illustrates an example of a system 100 that enables firmware 112a to be installed within a BMC 104 even when the BMC 104 is not running. The system 100 includes a host computing device 102, which includes a BMC 104 and a processor 106. The processor 106 may be referred to herein as a host processor 106. During normal operation, the BMC 104 is connected to the host processor 106 via a physical interface 108 and a logical interface 110. The physical interface 108 may be, for example, a Low Pin Count (LPC) bus, a Peripheral Component Interconnect Express (PCI-e) bus, or a Universal Serial Bus (USB). The logical interface 110 can be, for example, an Intelligent Platform Management Interface (IPMI), a Redfish interface, or a custom interface.

The BMC 104 includes firmware 112, which is stored in non-volatile memory 114 within the BMC 104. The firmware 112 includes instructions that are executed by a processor 128 within the BMC 104 in order to provide various functionality, including implementing the logical interface 110.

During normal operation, when both the host processor 106 and the BMC 104 are functioning properly, both the physical interface 108 and the logical interface 110 can be used to install replacement firmware 112a within the BMC 104. In particular, communication between the host processor 106 and the BMC 104 can occur across the physical interface 108 in accordance with various requirements specified by the logical interface 110. The logical interface 110 can specify certain security mechanisms that make the process of installing the replacement firmware 112a within the BMC 104 relatively secure. For example, the logical interface 110 can be configured to verify the authenticity of the replacement firmware 112a that is being installed.

In some embodiments, the replacement firmware 112a can be a reinstallation of the existing firmware 112 on the BMC 104. In other words, the replacement firmware 112a can be identical (or substantially identical) to the existing firmware 112 when the existing firmware 112 was originally installed, and the reinstallation can be performed because the existing firmware 112 has become corrupted in some way. Alternatively, the replacement firmware 112a can be an updated version of the existing firmware 112.

Under some circumstances, however, the BMC 104 can stop functioning properly. When this occurs, the logical interface 110 between the host processor 106 and the BMC 104 is no longer available, because the logical interface 110 depends in part on instructions contained within the firmware 112.

When the BMC 104 is not running and the logical interface 110 between the host processor 106 and the BMC 104 is unavailable, it is possible for the host processor 106 to install the replacement firmware 112a within the BMC 104 using just the physical interface 108. In other words, the BMC 104 provides a mechanism that enables the host processor 106 to access the non-volatile memory 114 of the BMC 104 via the physical interface 108 even when the logical interface 110 is not available. In some embodiments, the host processor 106 can take control of the BMC 104 and put the BMC 104 into a reset mode. In this context, the term "reset mode" can refer to a state in which code can be written to the non-volatile memory 114 of the BMC 104. The BMC 104 can be configured so that when the BMC 104 is in the reset mode, any code (e.g., firmware 112) that is stored in the non-volatile memory 114 is not being executed by the BMC processor 128. The BMC 104 can be placed into reset mode before the BMC 104 is rebooted. Once the BMC 104 has been placed into reset mode, the host processor 106 can then write information (e.g., the replacement firmware 112a) to the non-volatile memory 114 across the physical interface 108.

As discussed above, however, this mechanism for installing firmware 112a using just the physical interface 108 makes the BMC 104 vulnerable to security attacks. For example, if an attacker is able to gain access to the host processor 106, then the attacker can write malicious code to the non-volatile memory 114. One potential solution to this security vulnerability is to disable the physical interface 108 between the BMC 104 and the host processor 106 when the BMC 104 is not running. In other words, the host computing device 102 can be configured so that when the BMC 104 is running, the physical interface 108 connects the BMC 104 to the host processor 106. This allows the replacement firmware 112a to be installed using the physical interface 108 and the logical interface 110 in the manner described above. When the BMC 104 is not running, however, the physical interface 108 between the BMC 104 and the host processor 106 can be disabled in order to prevent malicious attacks on the BMC 104.

Disabling the physical interface 108 between the BMC 104 and the host processor 106 when the BMC 104 is not running prevents attackers from being able to write malicious code to the firmware 112, which is important. However, disabling the physical interface 108 when the BMC 104 is not running also prevents an authorized user (e.g., a system administrator) from installing replacement firmware 112a within the BMC 104.

In order to make it possible for someone with proper authorization to install replacement firmware 112a within the BMC 104, the host computing device 102 includes circuitry 116 that is configured to enable the physical interface 108 between the BMC 104 and the host processor 106 in response to receiving an authorization signal sequence 118 from another entity 120. Therefore, when the BMC 104 is not running, someone with proper authorization can make it possible for the replacement firmware 112a to be installed within the BMC 104 by causing the entity 120 to send the authorization signal sequence 118 to the circuitry 116 on the host computing device 102, thereby enabling the physical interface 108 between the BMC 104 and the host processor 106. Once the physical interface 108 has been enabled, the host processor 106 can then write the replacement firmware 112a to the non-volatile memory 114 within the BMC 104 across the physical interface 108.

The entity 120 that sends the authorization signal sequence 118 can be external to the host computing device 102. In other words, the entity 120 that sends the authorization signal sequence 118 can be separate from and exist independently of the host computing device 102. In addition, the entity 120 that sends the authorization signal sequence 118 can be trusted by the host computing device 102. In other words, the entity 120 that sends the authorization signal sequence 118 can be known to the host computing device 102, and the host computing device 102 can be configured to rely on communications from the entity 120. For example, the host computing device 102 can be configured to perform actions when instructed to do so by the entity 120. Because the entity 120 is external to and trusted by the host computing device 102, the entity 120 can be referred to as a trusted external entity 120.

The circuitry 116 can be configured to disable the physical interface 108 whenever the BMC 104 enters the reset mode unless the circuitry 116 has received an authorization signal sequence 118 from a trusted external entity 120. In some embodiments, the circuitry 116 disables the physical interface 108 if the BMC 104 enters the reset mode and an authorization signal sequence 118 has not been received in coordination with the BMC 104 entering the reset mode. On the other hand, the circuitry 116 can be configured to enable the physical interface 108 if the BMC 104 enters the reset mode and an authorization signal sequence 118 is received from a trusted external entity 120 in coordination with the BMC 104 entering the reset mode.

In some embodiments, the circuitry 116 can be configured to enable the physical interface 108 for a limited time duration in response to receiving the authorization signal sequence 118. For example, the circuitry 116 can be configured to enable the physical interface 108 only for a single boot sequence of the BMC 104 in response to receiving the authorization signal sequence 118. This allows the host processor 106 to install the replacement firmware 112a within the non-volatile memory 114 of the BMC 104 and to reboot the BMC 104. If the BMC 104 starts working again after being rebooted with the replacement firmware 112a, the physical interface 108 can be enabled because the logical interface 110 is available to protect against installation of malicious code in the BMC 104. However, if the BMC 104 is still not running even after being rebooted with the replacement firmware 112a, then after the boot sequence has ended the physical interface 108 can be disabled again in order to protect against the security vulnerability described above.

FIG. 1 shows the host processor 106 on the host computing device 102 receiving the replacement firmware 112a from a system manager 122. FIG. 1 also shows the host processor 106 receiving a command 126 from the system manager 122 to install the replacement firmware 112a on the BMC 104. In addition to providing the replacement firmware 112a and the command 126 to the host processor 106, the system manager 122 is also shown providing a signal 124 to the trusted external entity 120 that causes the trusted external entity 120 to send the authorization signal sequence 118 to the circuitry 116 on the host computing device 102. Communications between the trusted external entity 120 and the circuitry 116 can occur via a secure communication channel such that it is highly unlikely that an attacker could gain access to or compromise such communications.

The system manager 122 can represent a service that performs management functions for the host computing device 102. In some embodiments, the host computing device 102 can be one of a plurality of host computing devices for which the system manager 122 performs management functions. In some embodiments, the host computing device 102 can be one of a plurality of bare-metal servers that are rented to customers, and the system manager 122 can represent a service that performs management functions for the bare-metal servers. As another example, the host computing device 102 can be one of a plurality of host computing devices that are part of a distributed computing system (e.g., a cloud computing system). The system manager 122 can represent a service that performs management functions for the distributed computing system.

The system 100 shown in FIG. 1 accomplishes the two objectives described above. First, the host computing device 102 is configured such that it is highly unlikely that an attacker would be able to write malicious code to the BMC 104. Second, the host computing device 102 is configured such that an authorized user can still install replacement firmware 112a within the BMC 104 from a remote location even when the BMC 104 is not running.

With respect to the first objective, suppose that an attacker is able to gain access to the host processor 106. As indicated above, the BMC 104 provides a mechanism that enables the host processor 106 to access the non-volatile memory 114 of the BMC 104 via the physical interface 108 even when the BMC 104 is not running and the logical interface 110 between the BMC 104 and the host processor 106 is not available. However, in the system 100 shown in FIG. 1, the circuitry 116 on the host computing device 102 disables the physical interface 108 when the BMC 104 is not running (e.g., when the BMC 104 enters a reset mode), thereby preventing an attacker from exploiting this mechanism and writing malicious code to the BMC 104 via the physical interface 108.

With respect to the second objective, it is possible for an authorized user to install replacement firmware 112a within the BMC 104 even when the BMC 104 is not running by causing a trusted external entity 120 to send an authorization signal sequence 118 to the circuitry 116 on the host computing device 102. The authorization signal sequence 118 causes the circuitry 116 on the host computing device 102 to enable the physical interface 108 between the BMC 104 and the host processor 106. Once the physical interface 108 has been enabled, the host processor 106 can write the replacement firmware 112a to the non-volatile memory 114 within the BMC 104 across the physical interface 108.

In the system 100 shown in FIG. 1, the host computing device 102 is shown generally with circuitry 116 that disables the physical interface 108 between the BMC 104 and the host processor 106 when the BMC 104 is not running, and that also enables the physical interface 108 in response to receiving an authorization signal sequence 118 from a trusted external entity 120. In an alternative embodiment, the host computing device 102 can include distinct circuitry for performing these actions. For example, the host computing device 102 can include disabling circuitry that is configured to disable the physical interface 108 between the BMC 104 and the host processor 106 when the BMC 104 is not running, and enabling circuitry that is configured to enable the physical interface 108 in response to receiving an authorization signal sequence 118 from a trusted external entity 120.

Although the replacement firmware 112a and the command 126 are shown separately in FIG. 1, this does not mean that the replacement firmware 112a and the command 126 are necessarily sent to the host processor 106 in separate communications. In some embodiments, the replacement firmware 112a and the command 126 can be sent to the host processor 106 in the same communication (e.g., the same message) sent by the system manager 122 to the host processor 106. In other embodiments, however, the replacement firmware 112a and the command 126 can be sent to the host processor 106 in separate communications (e.g., separate messages) sent by the system manager 122 to the host processor 106.

Figure 2:
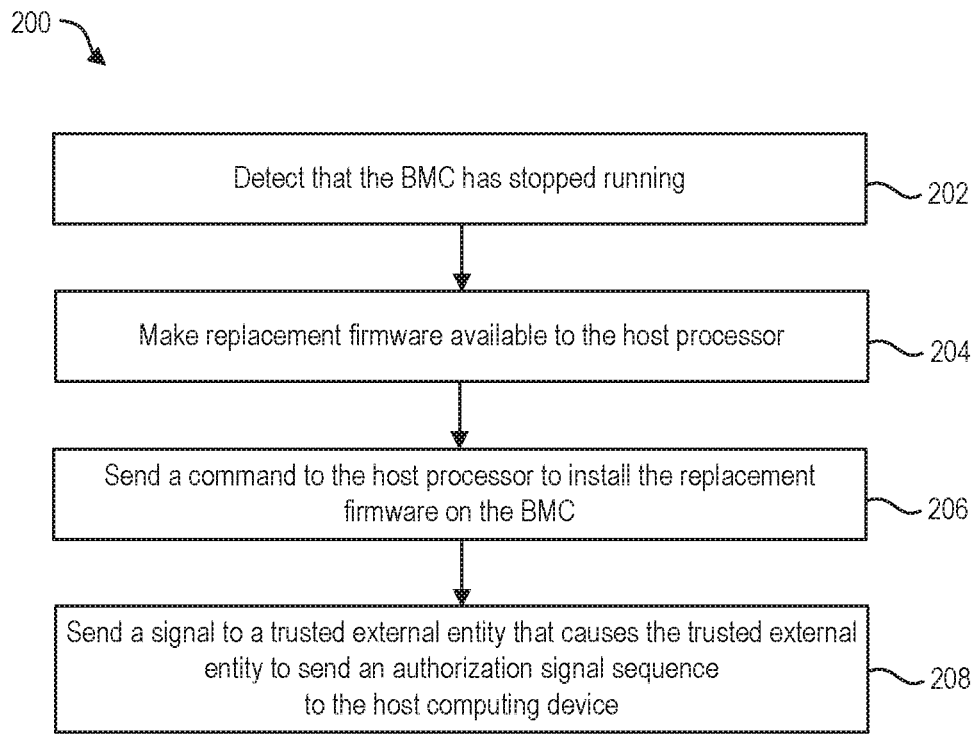
FIG. 2 illustrates an example of a method that can be performed by a system manager in order to securely install replacement firmware within a BMC when the BMC has stopped running.

FIG. 2 illustrates an example of a method 200 that can be performed by a system manager 122 in order to securely install replacement firmware 112a within a BMC 104 when the BMC 104 has stopped running. The method 200 will be described in relation to the system manager 122 and the other components in the system 100 shown in FIG. 1.

In accordance with the method 200, the system manager 122 can detect 202 that the BMC 204 has stopped running. There are many different ways that this can occur. As an example, the system manager 122 can send the BMC 104 a signal (e.g., via the host processor 106) that would trigger a response from the BMC 104 if the BMC 104 were functioning properly. If the BMC 104 does not respond to the signal, then the system manager 122 can infer that the BMC 104 has stopped running. As another example, another entity (e.g., an entity on the host computing device 102) can determine that the BMC 204 has stopped running and report that to the system manager 122.

In response to detecting 202 that the BMC 204 has stopped running, the system manager 122 can make 204 replacement firmware 112a available to the host processor 106. In some embodiments, the system manager 122 can send the replacement firmware 112a to the host processor 106. In other embodiments, the system manager 122 can send the host processor 106 a link to a location where the replacement firmware 112a can be accessed and downloaded.

The system manager 122 can also send 206 a command 126 to the host processor 106 to install the replacement firmware 112a on the BMC 104. As discussed above, the replacement firmware 112a and the command 126 to install the replacement firmware 112a can be sent in the same communication (e.g., the same message) or in different communications (e.g., different messages).

In addition, the system manager 122 can also send 208 a signal 124 to the trusted external entity 120 that causes the trusted external entity 120 to send an authorization signal sequence 118 to the host computing device 102. The host computing device 102 includes circuitry 116 that is configured to recognize the authorization signal sequence 118. In response to receiving and recognizing the authorization signal sequence 118, the circuitry 116 enables the physical interface 108 between the BMC 104 and the host processor 106. Once the physical interface 108 has been enabled, the host processor 106 can then write the replacement firmware 112a to the non-volatile memory 114 within the BMC 104 across the physical interface 108.

Figure 3:
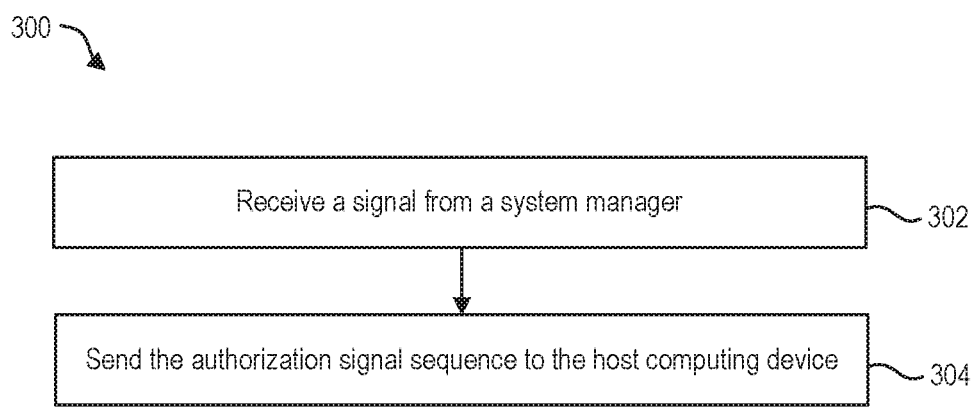
FIG. 3 illustrates an example of a method that can be performed by a trusted external entity in order to securely install replacement firmware within a BMC when the BMC has stopped running.

FIG. 3 illustrates an example of a method 300 that can be performed by a trusted external entity 120 in order to securely install replacement firmware 112a within a BMC 104 when the BMC 104 has stopped running. The method 300 will be described in relation to the trusted external entity 120 and the other components in the system 100 shown in FIG. 1.

In accordance with the method 300, the trusted external entity 120 can receive 302 a signal 124 from a system manager 122. The signal 124 can include (or can be interpreted to include) an instruction to send an authorization signal sequence 118 to the host computing device 102.

In response to receiving 302 the signal 124 from the system manager 122, the trusted external entity 120 can send 304 the authorization signal sequence 118 to the host computing device 102. As discussed above, the authorization signal sequence 118 causes circuitry 116 within the host computing device 102 to enable the physical interface 108 between the BMC 104 and the host processor 106, so that the host processor 106 can write the replacement firmware 112a to the non-volatile memory 114 within the BMC 104 across the physical interface 108.

Figure 4:
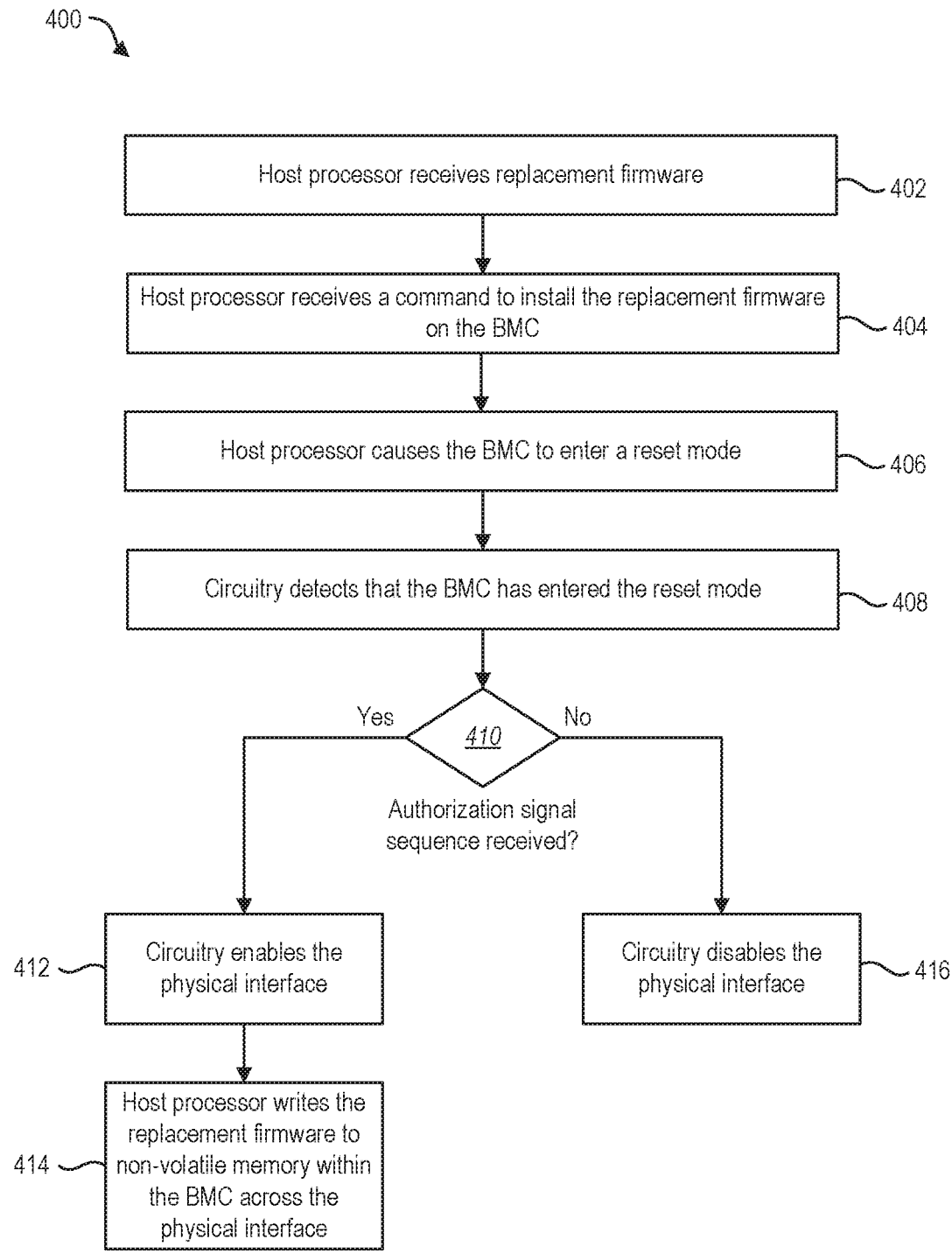
FIG. 4 illustrates an example of a method that can be performed by a host computing device in order to securely install replacement firmware within a BMC when the BMC has stopped running.

FIG. 4 illustrates an example of a method 400 that can be performed by a host computing device 102 in order to securely install replacement firmware 112a within a BMC 104 when the BMC 104 has stopped running. The method 400 will be described in relation to the host computing device 102 and the other components in the system 100 shown in FIG. 1. Some of the actions included in the method 400 can be performed by a host processor 106 executing instructions that are stored in memory within the host computing device 102, and some of the actions included in the method 400 can be performed by circuitry 116 within the host computing device 102.

In accordance with the method 400, the host processor 106 within the host computing device 102 can receive 402 replacement firmware 112a from a system manager 122. In some embodiments, the host processor 106 can receive 402 the replacement firmware 112a directly from the system manager 122. In other embodiments, the host processor 106 can receive 402 information (e.g., a link) from the system manager 122 that enables the host processor 106 to access and download the replacement firmware 112a from another location.

The host processor 106 can also receive 404 a command 126 to install the replacement firmware 112a on the BMC 104. In response to receiving 402 the replacement firmware 112a and receiving 404 the command 126 to install the replacement firmware 112a, the host processor 106 can cause 406 the BMC 104 to enter a reset mode. For example, the host processor 106 can send one or more commands to the BMC 104 that cause the BMC 104 to enter the reset mode.

The circuitry 116 can detect 408 that the BMC 104 has entered the reset mode. In response to detecting 408 that the BMC 104 has entered the reset mode, the circuitry 116 can determine 410 whether an authorization signal sequence 118 has been received from a trusted external entity 120. If an authorization signal sequence 118 has been received from a trusted external entity 120, then the circuitry 116 can enable 412 the physical interface 108 between the BMC 104 and the host processor 106. Enabling 412 the physical interface 108 between the BMC 104 and the host processor 106 allows the host processor 106 to write 414 the replacement firmware 112a to the non-volatile memory 114 within the BMC 104 across the physical interface 108, as described above.

As discussed above, the circuitry 116 can be configured to enable 412 the physical interface 108 for a limited time duration in response to receiving the authorization signal sequence 118. For example, the circuitry 116 can be configured to enable the physical interface 108 only for a single boot sequence of the BMC 104 in response to receiving the authorization signal sequence 118. If the BMC 104 starts working again after being rebooted with the replacement firmware 112a, the physical interface 108 can be enabled because the logical interface 110 is available to protect against installation of malicious code in the BMC 104. However, if the BMC 104 is still not running even after being rebooted with the replacement firmware 112a, then after the boot sequence has ended the physical interface 108 can be disabled again in order to protect against the security vulnerability described above.

If it is determined 410 that an authorization signal sequence 118 has not been received from a trusted external entity 120, then the circuitry 116 can disable 416 the physical interface 108 between the BMC 104 and the host processor 106. Disabling 416 the physical interface 108 between the BMC 104 and the host processor 106 prevents the host processor 106 from writing anything to the non-volatile memory 114 within the BMC 104. As discussed above, this feature can be advantageous if an attacker has gained access to the host processor 106 and is attempting to write malicious code to the non-volatile memory 114 within the BMC 104.

In some embodiments, the circuitry 116 disables the physical interface 108 whenever the BMC 104 enters the reset mode unless an authorization signal sequence 118 has been received from a trusted external entity 120 in coordination with the BMC 104 entering the reset mode. In other words, in some embodiments the circuitry 116 can be configured to disable the physical interface 108 by default whenever the BMC 104 enters the reset mode, and the circuitry 116 can also be configured so that this default condition is only changed if (a) an authorization signal sequence 118 is received from a trusted external entity 120, and (b) there is some relationship (e.g., a temporal relationship) between the receipt of the authorization signal sequence 118 and the BMC 104 entering the reset mode. In some embodiments, an authorization signal sequence 118 can be considered to be received in coordination with the BMC 104 entering the reset mode if the authorization signal sequence 118 is received at the same time (or substantially the same time) as the BMC 104 enters the reset mode. In other embodiments, an authorization signal sequence 118 can be considered to be received in coordination with the BMC 104 entering the reset mode if the authorization signal sequence 118 is received within a certain period of time (either before or after) from when the BMC 104 enters the reset mode. This period of time can be pre-defined and stored in memory of the host computing device 102 as a (potentially configurable) parameter.

Figure 5:
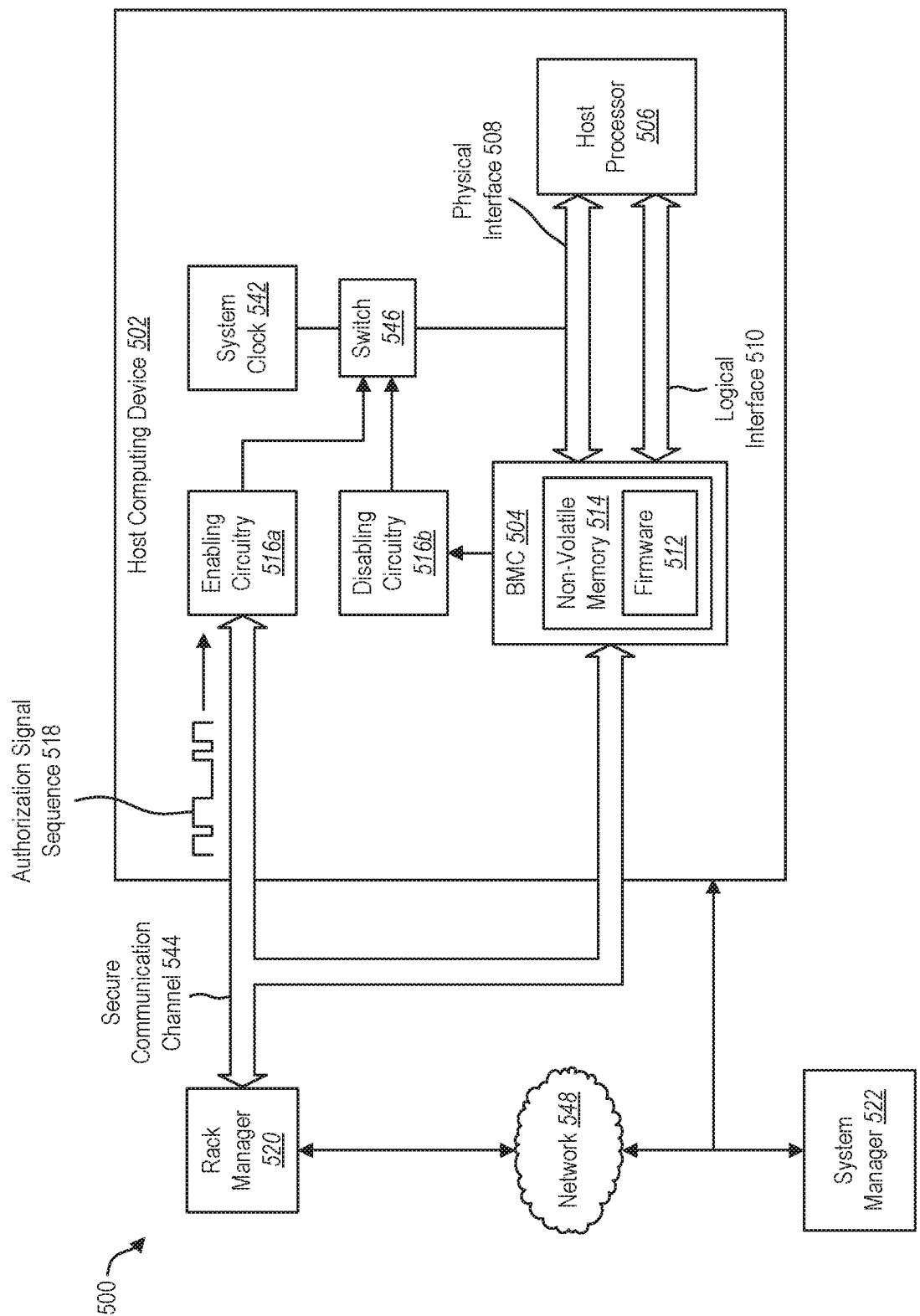
FIG. 5 illustrates another example of a system that enables firmware to be installed within a BMC even when the BMC is not running.

FIG. 5 illustrates another example of a system 500 that enables firmware 512a to be installed within a BMC 504 even when the BMC 504 is not running. The system 500 shown in FIG. 5 is similar to the system 100 shown in FIG. 1, except as described below.

In the system 500 shown in FIG. 5, the host computing device 502 includes enabling circuitry 516a that is configured to enable the physical interface 508 between the BMC 504 and the host processor 506 in response to receiving an authorization signal sequence 518 from a trusted external entity. The host computing device 502 also includes disabling circuitry 516b that is configured to disable the physical interface 508 when the BMC 504 is not running and the logical interface 510 between the BMC 504 and the host processor 506 is not available. Taken together, the enabling circuitry 516a and the disabling circuitry 516b represent one possible implementation of the circuitry 116 in the system 100 shown in FIG. 1.

In the depicted system 500, the enabling and disabling of the physical interface 508 can be accomplished by connecting and disconnecting the physical interface 508 to a system clock 542. FIG. 5 shows a switch 546 between the system clock 542 and the physical interface 508. When the disabling circuitry 516b detects that the BMC 504 is not running (e.g., that the BMC 504 has entered a reset mode), the disabling circuitry 516b can configure the switch 546 so that the physical interface 508 is disconnected from the system clock 542. When the enabling circuitry 516a receives an authorization signal sequence 518, the enabling circuitry 516a can configure the switch 546 so that the physical interface 508 is connected to the system clock 542.

In some embodiments, the enabling circuitry 516a can be a programmable logic device (PLD) that is has been programmed to recognize the authorization signal sequence 518. The authorization signal sequence 518 can be a unique sequence of binary signals. For example, the authorization signal sequence can be a sequence of high and low signals, and the duration of the high and low signals can be selected such that the overall sequence is unique. The authorization signal sequence 518 can be pre-defined. For example, in advance of receiving the authorization signal sequence 518, the enabling circuitry 516a can be programmed to recognize the unique pattern formed by the authorization signal sequence 518. In addition, the enabling circuitry 516a can be programmed to enable the physical interface 508 in response to recognizing the unique pattern formed by the authorization signal sequence 518.

The host computing device 502 can be one of a plurality of host computing devices that are located within the same physical structure, such as a rack. The trusted external entity that sends the authorization signal sequence 518 to the enabling circuitry 516a can be an entity that manages all of the host computing devices within the same rack. Such an entity may be referred to herein as a rack manager 520. FIG. 5 shows a secure communication channel 544 between the rack manager 520 and the host computing device 502. The rack manager 520 can be configured to send the authorization signal sequence 518 to the enabling circuitry 516a via the secure communication channel 544.

The rack manager 520 can be in electronic communication with a system manager 522 via a connection to a computer network 548. The host computing device 502 can also be connected to the network 548. The network 548 can be a wide area network (WAN) or a local area network (LAN). In some embodiments, the network 548 can include the Internet. Communications across the network 548 can occur via wireless and/or wired connections.

The system manager 522 can use its connection to the network 548 to provide the host computing device 502 with replacement firmware 512a to be installed in non-volatile memory 514 within the BMC 504. The system manager 522 can also use its connection to the network 548 to send a signal to the rack manager 520 that causes the rack manager 520 to send the authorization signal sequence 518 to the enabling circuitry 516a within the host computing device 502 via the secure communication channel 544.

The secure communication channel 544 between the rack manager 520 and the host computing device 502 can be considered to be an out-of-band communication channel. In general terms, an out-of-band communication channel can refer to a communication channel that is separate from a primary communication channel. In the depicted system 500, the primary communication channel between the rack manager 520 and the host computing device 502 can occur via the network 548. Many of the communications between the rack manager 520 and the host computing device 502 can occur via the primary communication channel (i.e., via the network 548). However, sending an authorization signal sequence 518 to the enabling circuitry 516a within the host computing device 502 can occur via the secure, out-of-band communication channel 544.

Figure 6:
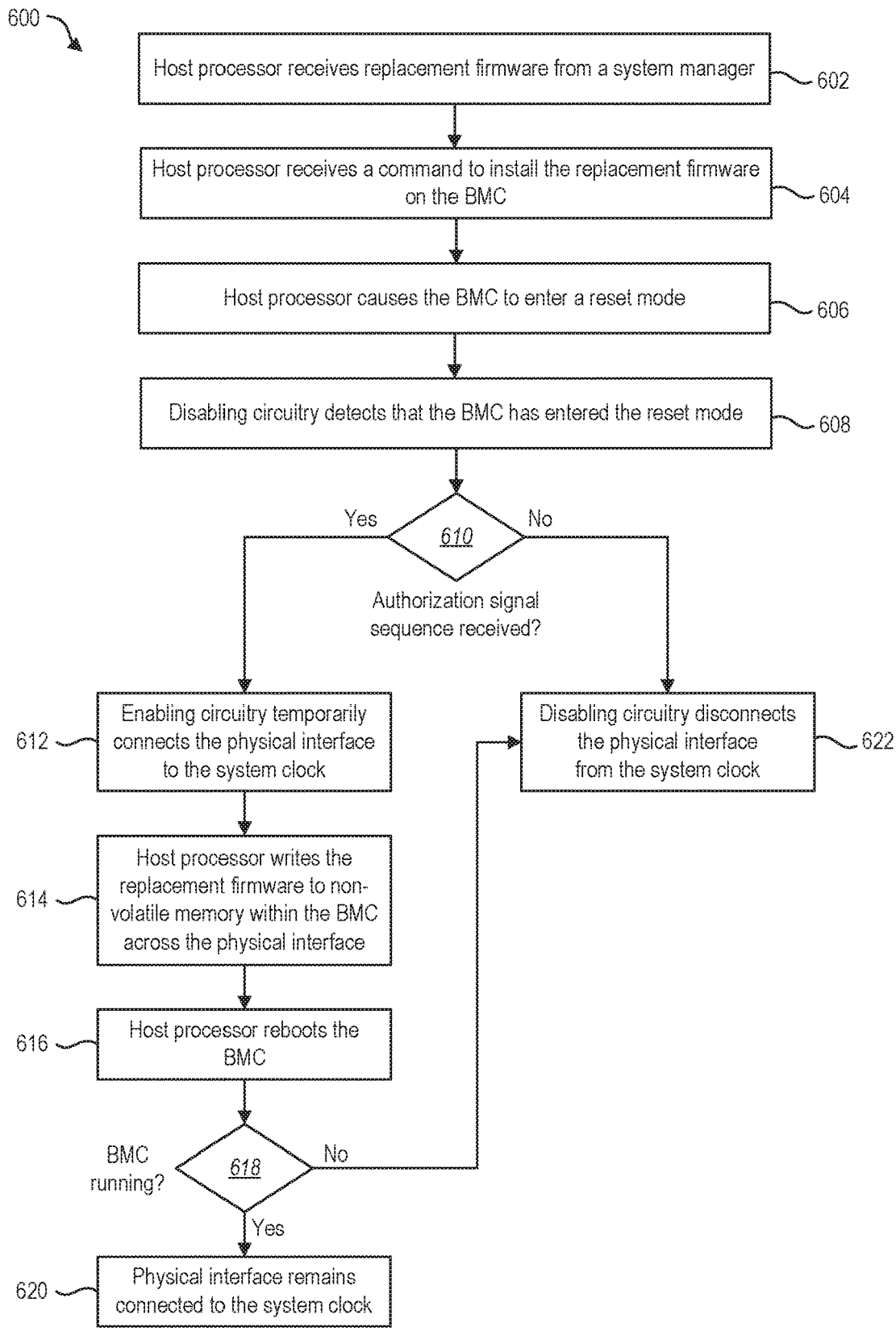
FIG. 6 illustrates another example of a method that can be performed by a host computing device in order to securely install replacement firmware within a BMC when the BMC has stopped running.

FIG. 6 illustrates another example of a method 600 that can be performed by a host computing device 502 in order to securely install replacement firmware 512a within a BMC 504 when the BMC 504 has stopped running. The method 600 will be described in relation to the host computing device 502 and the other components in the system 500 shown in FIG. 5. Some of the actions included in the method 600 can be performed by a host processor 506 executing instructions that are stored in memory within the host computing device 502, and some of the actions included in the method 600 can be performed by circuitry 516 within the host computing device 502.

The first few actions of the method 600 are similar to the first few actions of the method 400 that was discussed above in connection with FIG. 4. The host processor 506 within the host computing device 502 can receive 602 replacement firmware 512a from a system manager 522. The host processor 506 can also receive 604 a command to install the replacement firmware 512a on the BMC 504. In response to receiving 602 the replacement firmware 512a and receiving 604 the command to install the replacement firmware 512a, the host processor 506 can cause 606 the BMC 504 to enter a reset mode.

In the depicted method 600, the disabling circuitry 516b detects 608 that the BMC 504 has entered the reset mode. The disabling circuitry 516b can be configured to disable the physical interface 508 whenever the BMC 504 enters the reset mode unless an authorization signal sequence 518 has been received from a trusted external entity 520. Thus, the method 600 also includes determining 610 whether an authorization signal sequence 518 has been received from a trusted external entity, such as a rack manager 520.

If an authorization signal sequence 518 has been received from the rack manager 520, then the enabling circuitry 516a can temporarily connect 612 the physical interface 508 to the system clock 542. In other words, the enabling circuitry 516a can connect 612 the physical interface 508 to the system clock 542 for a limited time duration, such as a single boot sequence of the BMC 504. This allows the host processor 506 to write 614 the replacement firmware 512a to the non-volatile memory 514 within the BMC 504 across the physical interface 508, as described above. The host processor 506 can then reboot 616 the BMC 504.

The method 600 also includes determining 618, after the BMC 504 has been rebooted, whether the BMC 504 is running. If the BMC 504 is running, then the physical interface 508 can remain 620 connected to the system clock 542 because the security mechanisms within the logical interface 510 are available to protect against installation of malicious code in the BMC 504. If, however, the BMC 504 is not running, then the disabling circuitry 516b can disconnect 622 the physical interface 508 from the system clock 542 in order to protect the BMC 504 against the security vulnerability described above.

As indicated above, the techniques disclosed herein can be implemented in a system that includes a plurality of computing devices with BMCs. In some embodiments, the plurality of computing devices can be located within the same physical structure, such as a rack. The trusted external entity that sends an authorization signal sequence to circuitry within the computing devices can be a rack manager (i.e., an entity that performs management operations with respect to host computing devices within the rack).

Figure 7:
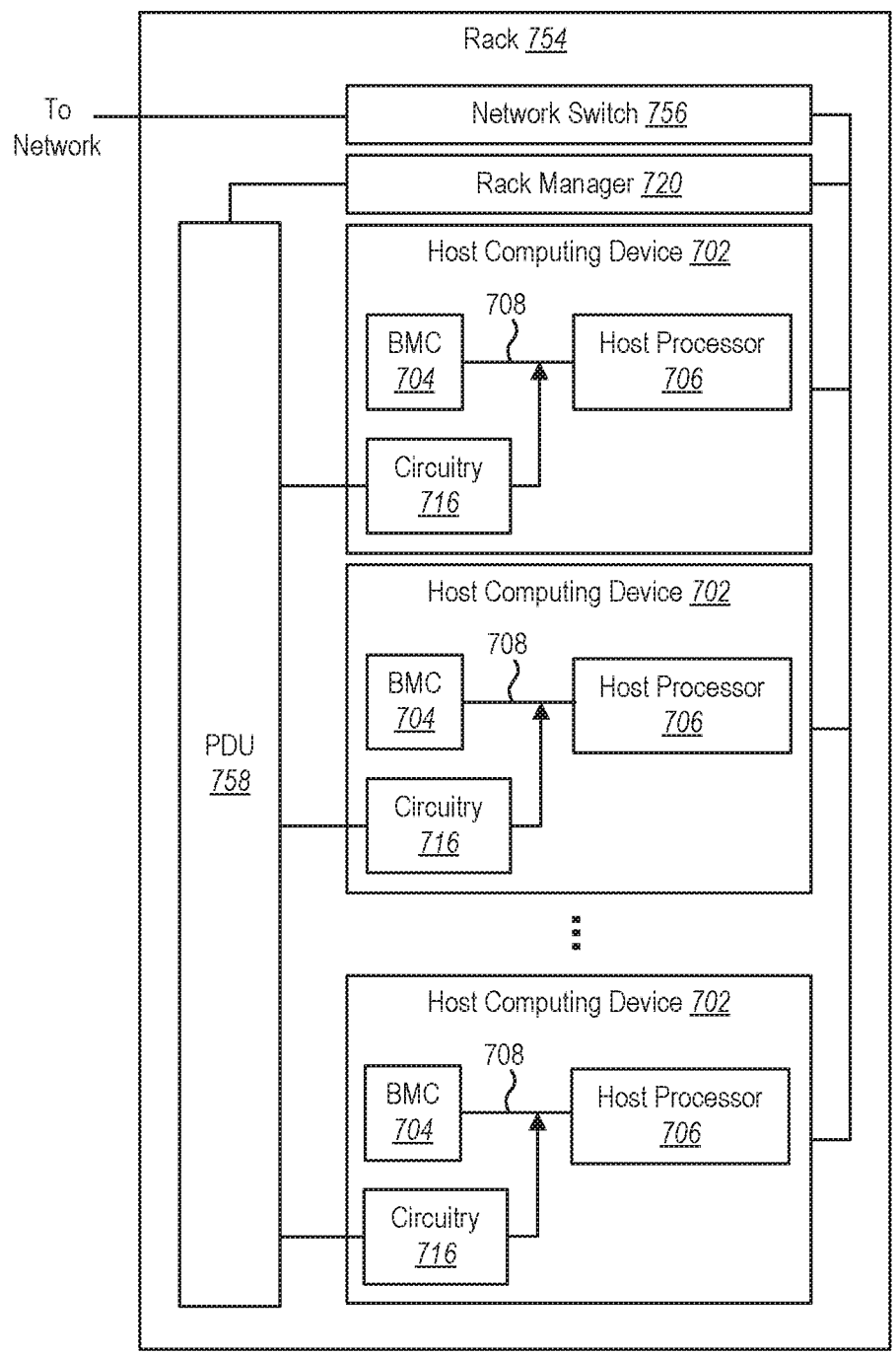
FIG. 7 illustrates an example of a plurality of host computing devices that can be located within the same physical structure and that can be configured to implement the techniques disclosed herein.

FIG. 7 illustrates an example of a plurality of host computing devices 702 that can be located within the same physical structure, such as a rack 754, and that can be configured to implement the techniques disclosed herein. Each host computing device 702 includes a BMC 704, a host processor 706, and a physical interface 708 between the BMC 704 and the host processor 706. Each host computing device 702 also includes circuitry 716 that is configured to disable the physical interface 708 when the BMC 704 is not running and to enable the physical interface 708 in response to receiving an authorization signal sequence from a trusted external entity.

In the depicted embodiment, the trusted external entity can be a rack manager 720 that is responsible for performing management operations with respect to host computing devices 702 within the rack 754. The rack manager 720 is shown in electronic communication with the host computing devices 702 via a power distribution unit (PDU) 758. The rack manager 720 can send an authorization signal sequence to the circuitry 716 within one or more host computing devices 702 via the PDU 758.

FIG. 7 also shows the rack manager 720 and the host computing devices 702 in electronic communication with a network switch 756, which facilitates a connection to a network (such as the network 548 shown in FIG. 5). Thus, the rack manager 720 is able to communicate with the host computing devices 702 via a network connection. This network connection may be considered to be the primary communication channel (or communication path) between the rack manager 720 and the host computing devices 702. The communication channel (or communication path) from the rack manager 720 to the circuitry 716 within the host computing devices 702 via the PDU 758 can be considered to be an out-of-band communication channel (or communication path).

The techniques disclosed herein can be useful for a service provider who rents bare-metal servers to customers. For example, the host computing devices 702 in the rack 754 can be bare-metal servers that are rented to customers. In this context, the term "bare-metal server" can refer to a host machine that has a single tenant. In other words, a bare-metal server is dedicated entirely to a single customer who is renting the bare-metal server (instead of being shared between customers). A service provider who rents bare-metal servers to customers typically does not control the type of software that the customers run on the servers. It is possible that a customer can install (unintentionally or possibly even intentionally) malicious software on a server. If such software can write malicious code to the BMC firmware, then the entire server can become compromised. The strategy of disconnecting the physical interface between the BMC and the host processor protects against this security vulnerability. Therefore, this strategy can be utilized by bare-metal server providers in order to protect their bare-metal servers from being compromised. As discussed above, however, disconnecting the physical interface between the BMC and the host processor makes it impossible to install firmware within the BMC. Consequently, bare-metal server providers can use the techniques disclosed herein to enable BMC firmware to be updated within their bare-metal servers, while still protecting their bare-metal servers against the security vulnerability described above.

As discussed above, the techniques disclosed herein are related to installing firmware within a BMC. In this context, the term "install" (and grammatical variants thereof) can refer to the process of transferring firmware into non-volatile memory within a BMC and preparing the firmware for execution by the BMC's processor. In some embodiments, the firmware that is installed within a BMC may be an updated version of the firmware that currently exists within the BMC. In other embodiments, the firmware that is installed within a BMC may be identical (or substantially identical) to firmware that currently exists within the BMC. In this case, the installation of the firmware may essentially be a reinstallation of the same firmware that was previously installed. Depending on the circumstances, either type of installation can be performed in response to detecting that a BMC has stopped running. If updated firmware is available, the updated firmware can be installed within the BMC as part of an attempt to get the BMC to start running again. If, however, only the same version of the firmware is available, then the same firmware can be reinstalled within the BMC in an attempt to get the BMC to start running again.

Figure 8:
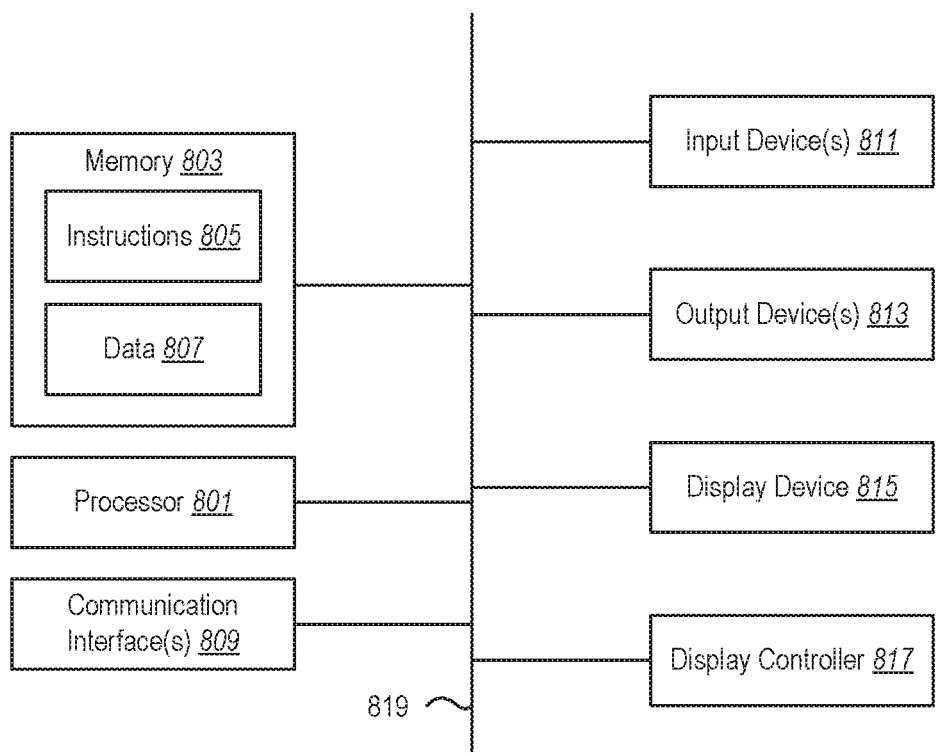
FIG. 8 illustrates certain components that can be included within a computing device.

One or more computing devices 800 can be used to implement at least some aspects of the techniques disclosed herein. FIG. 8 illustrates certain components that can be included within a computing device 800.

The computing device 800 includes a processor 801 and memory 803 in electronic communication with the processor 801. Instructions 805 and data 807 can be stored in the memory 803. The instructions 805 can be executable by the processor 801 to implement some or all of the methods, steps, operations, actions, or other functionality that is disclosed herein. Executing the instructions 805 can involve the use of the data 807 that is stored in the memory 803. Unless otherwise specified, any of the various examples of modules and components described herein can be implemented, partially or wholly, as instructions 805 stored in memory 803 and executed by the processor 801. Any of the various examples of data described herein can be among the data 807 that is stored in memory 803 and used during execution of the instructions 805 by the processor 801.

Although just a single processor 801 is shown in the computing device 800 of FIG. 8, in an alternative configuration, a combination of processors (e.g., an ARM and DSP) could be used.

The computing device 800 can also include one or more communication interfaces 809 for communicating with other electronic devices. The communication interface(s) 809 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 800 can also include one or more input devices 811 and one or more output devices 813. Some examples of input devices 811 include a keyboard, mouse, microphone, remote control device, button, joystick, trackball, touchpad, and lightpen. One specific type of output device 813 that is typically included in a computing device 800 is a display device 815. Display devices 815 used with embodiments disclosed herein can utilize any suitable image projection technology, such as liquid crystal display (LCD), light-emitting diode (LED), gas plasma, electroluminescence, or the like. A display controller 817 can also be provided, for converting data 807 stored in the memory 803 into text, graphics, and/or moving images (as appropriate) shown on the display device 815. The computing device 800 can also include other types of output devices 813, such as a speaker, a printer, etc.

The various components of the computing device 800 can be coupled together by one or more buses, which can include a power bus, a control signal bus, a status signal bus, a data bus, etc. For the sake of clarity, the various buses are illustrated in FIG. 8 as a bus system 819.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
   a processor;
   memory in electronic communication with the processor;
   a baseband management controller (BMC) comprising non-volatile memory;
   a physical interface between the BMC and the processor;
   disabling circuitry that is configured to disable the physical interface in response to detecting that the BMC has entered a reset mode;
   enabling circuitry that is configured to enable the physical interface in response to receiving an authorization signal sequence from a trusted external entity; and
   instructions stored in the memory, the instructions being executable by the processor to install firmware within the non-volatile memory of the BMC via the physical interface when the BMC is not running and the physical interface is enabled.

2. The computing device of claim 1, wherein the disabling circuitry is configured to disable the physical interface in response to detecting that the BMC has entered the reset mode unless the authorization signal sequence is received in coordination with the BMC entering the reset mode.

3. The computing device of claim 1, wherein the enabling circuitry is configured to enable the physical interface only for a single BMC boot sequence in response to receiving the authorization signal sequence.

4. The computing device of claim 1, wherein:
   the firmware implements a logical interface between the BMC and the processor;
   the logical interface is configured to verify authenticity of the firmware; and
   the logical interface is not available when the BMC is not running.

5. The computing device of claim 1, wherein:
   the authorization signal sequence comprises a unique sequence of binary signals; and
   the circuitry that enables the physical interface comprises a programmable logic device that is programmed to recognize the unique sequence.

6. The computing device of claim 1, wherein:
   disabling the physical interface comprises disconnecting the physical interface from a system clock; and
   enabling the physical interface comprises connecting the physical interface to the system clock.

7. The computing device of claim 1, wherein:
   the computing device is one of a plurality of computing devices that are located within a rack; and
   the trusted external entity comprises a rack manager.

8. The computing device of claim 1, wherein the authorization signal sequence is received from the trusted external entity via a secure, out-of-band communication channel.

9. A system, comprising:
   a trusted external entity; and
   a plurality of host computing devices in electronic communication with the trusted external entity, wherein each of the plurality of host computing devices comprises a host processor, a baseband management controller (BMC), a physical interface between the host processor and the BMC, and circuitry that is configured to:
      disable the physical interface between the host processor and the BMC in response to detecting that the BMC has entered a reset mode; and
      enable the physical interface between the host processor and the BMC in response to receiving an authorization signal sequence from the trusted external entity.

10. The system of claim 9, wherein each of the plurality of host computing devices further comprises:
    memory in electronic communication with the host processor; and
    instructions stored in the memory, the instructions being executable by the host processor to install firmware within non-volatile memory of the BMC via the physical interface when the BMC is not running and the physical interface is enabled.

11. The system of claim 9, wherein the disabling circuitry is configured to disable the physical interface in response to detecting that the BMC has entered the reset mode unless the authorization signal sequence is received in coordination with the BMC entering the reset mode.

12. The system of claim 9, wherein the enabling circuitry is configured to enable the physical interface only for a single BMC boot sequence in response to receiving the authorization signal sequence.

13. The system of claim 9, wherein:
    firmware in the BMC implements a logical interface between the BMC and the host processor;

the logical interface is configured to verify authenticity of the firmware; and the logical interface is not available when the BMC is not running.

14. The system of claim 9, wherein:

the authorization signal sequence comprises a unique sequence of binary signals; and the circuitry that enables the physical interface comprises a programmable logic device that is programmed to recognize the unique sequence.

15. The system of claim 9, wherein:

disabling the physical interface comprises disconnecting the physical interface from a system clock; and enabling the physical interface comprises connecting the physical interface to the system clock.

16. The system of claim 9, wherein:

the plurality of host computing devices are located within a rack; and the trusted external entity comprises a rack manager.

17. The system of claim 9, further comprising a secure, out-of-band communication channel between the trusted external entity and the circuitry that receives the authorization signal sequence, wherein the trusted external entity sends the authorization signal sequence to the circuitry via the secure, out-of-band communication channel.

18. A computer-readable medium comprising instructions that are executable by one or more processors to cause a computing system to:

detect that a baseboard management controller (BMC) within a host computing device has stopped running;

make replacement firmware available to a host processor within the host computing device; and send a signal to a trusted external entity that causes the trusted external entity to send an authorization signal sequence to the host computing device, wherein the trusted external entity is external to the host computing device, and wherein the authorization signal sequence causes a physical interface between the BMC and the host processor to be enabled.

\* \* \* \* \*